Patented Feb. 16, 1926.

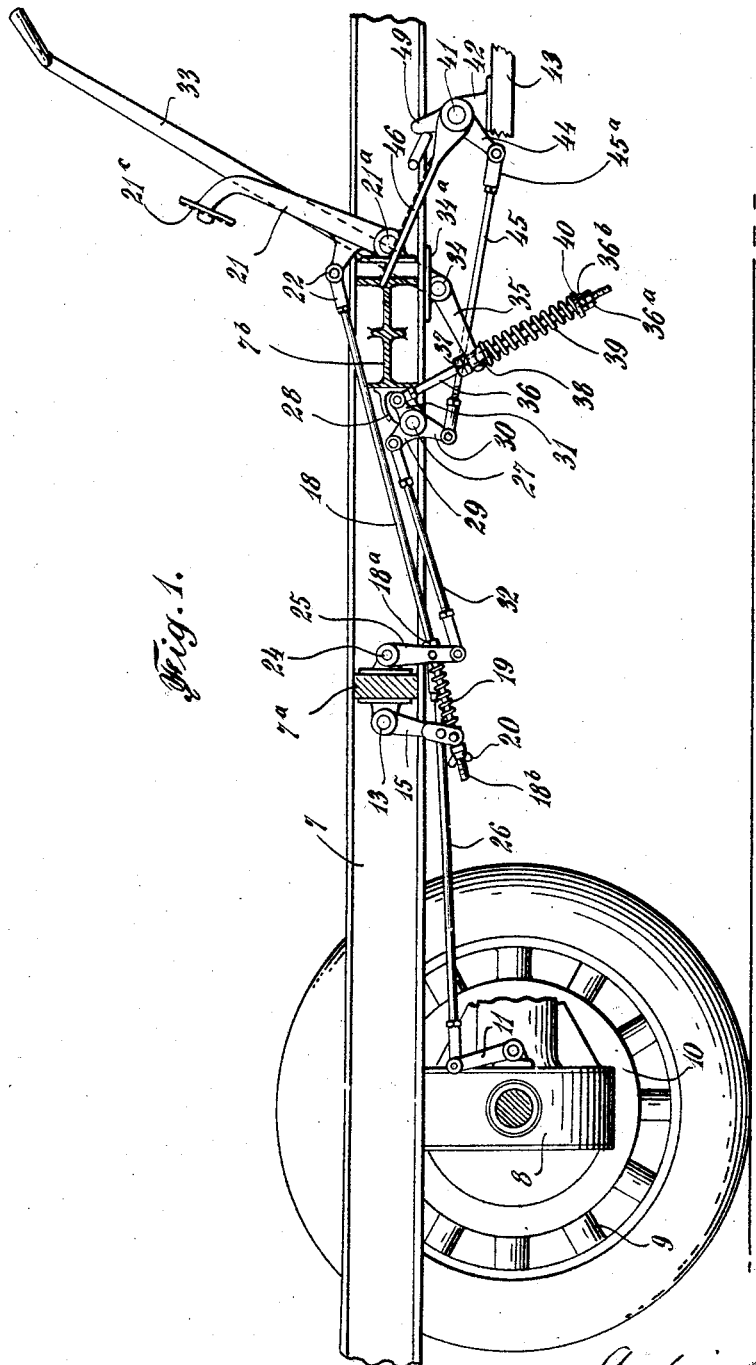

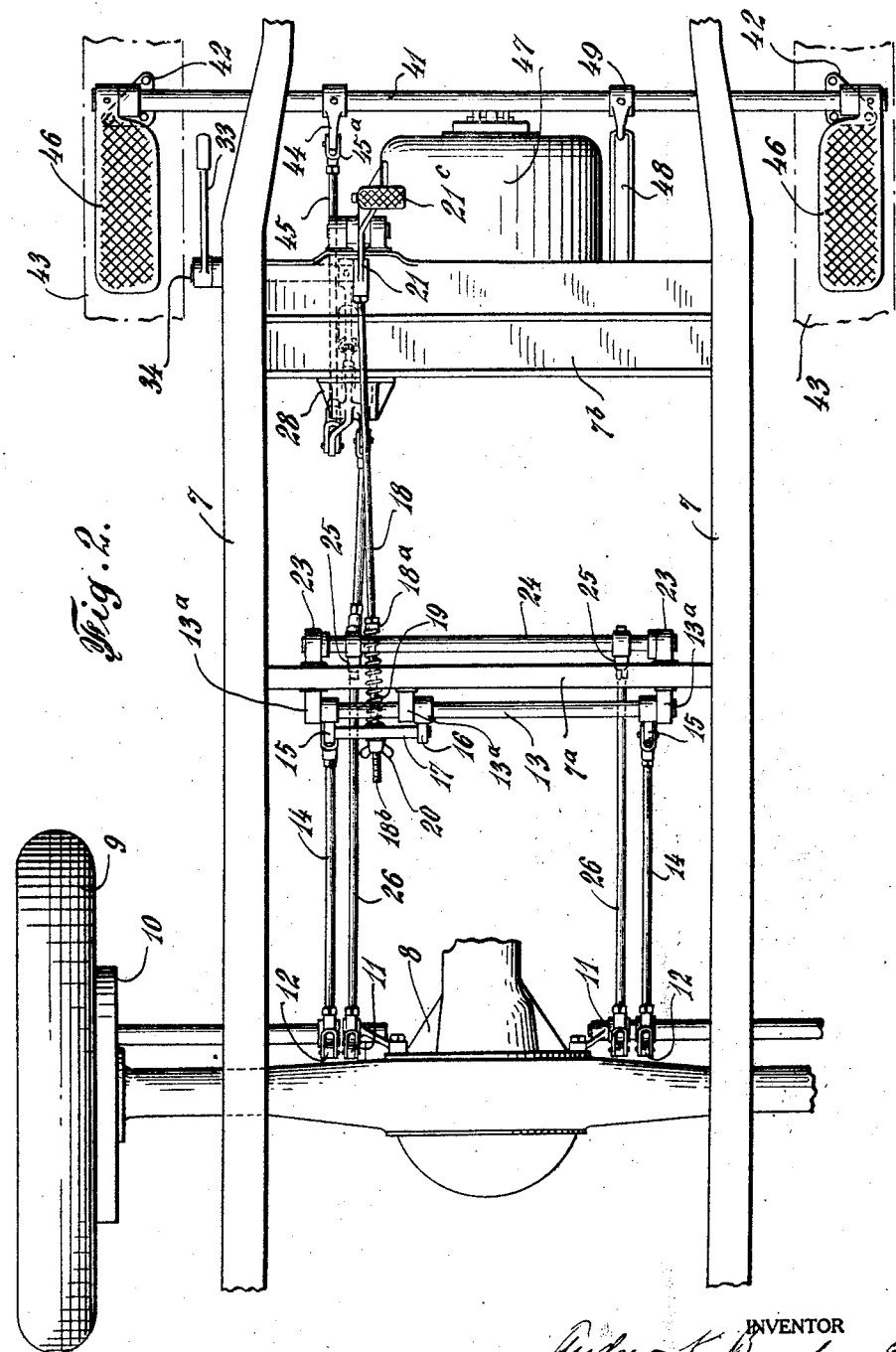

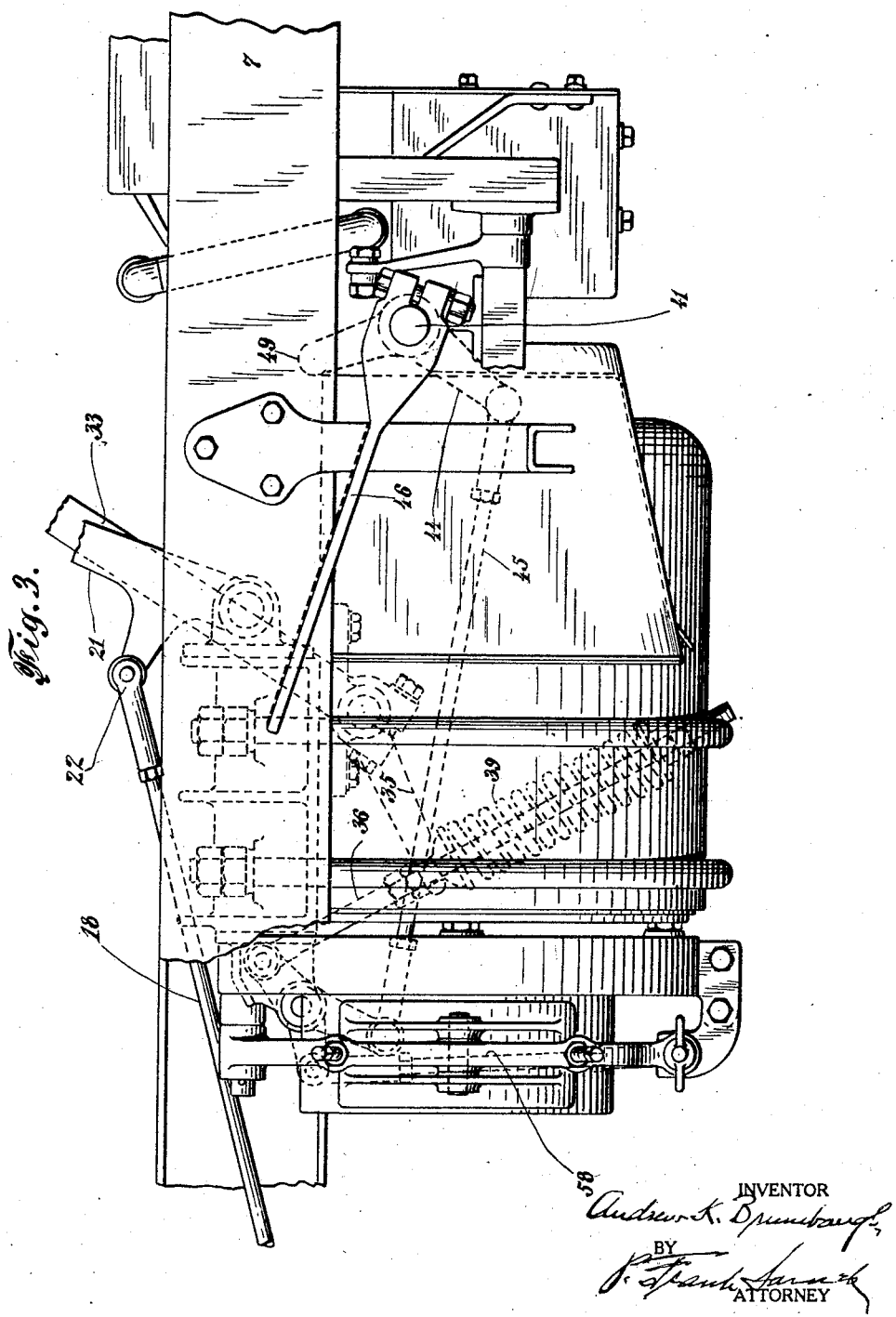

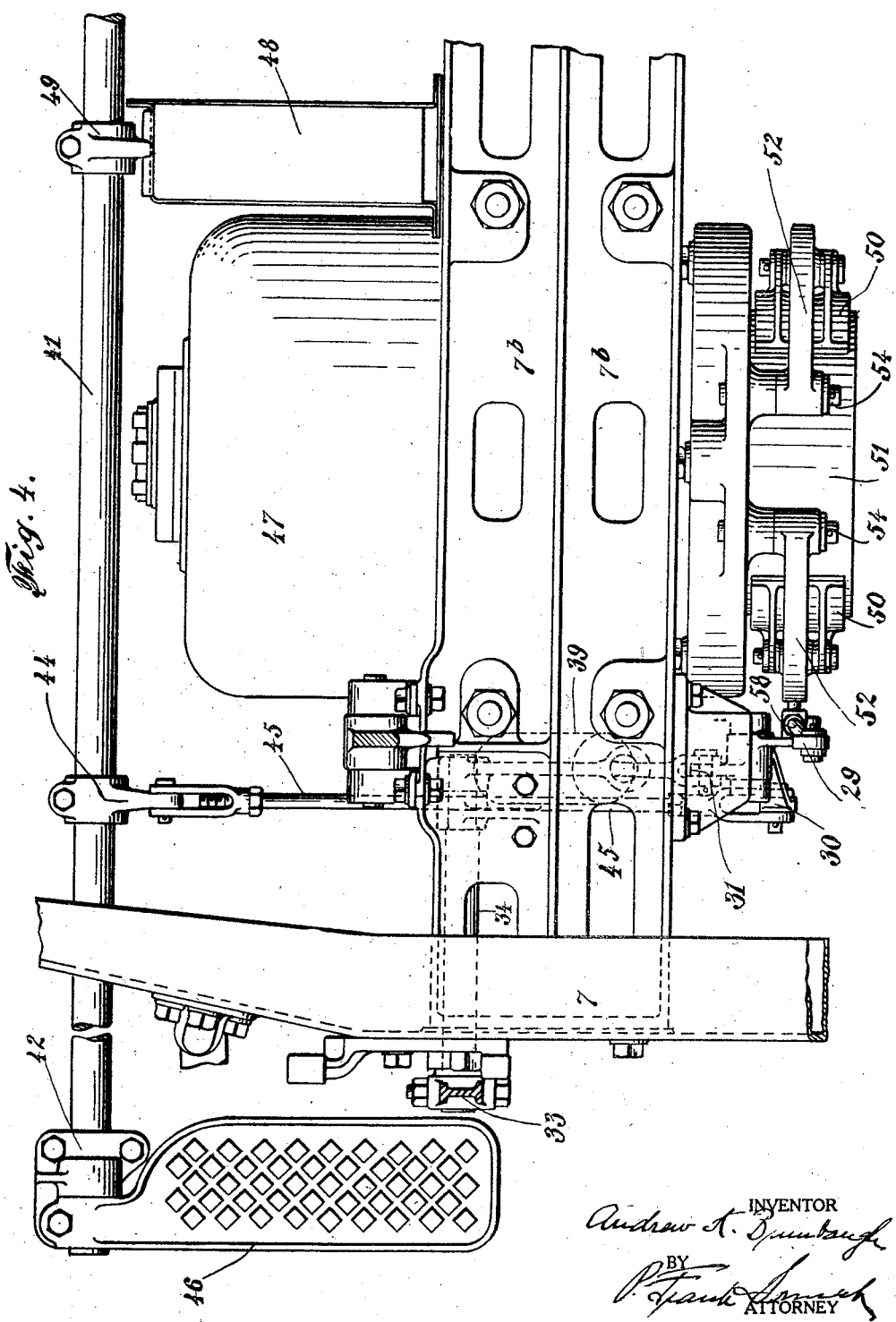

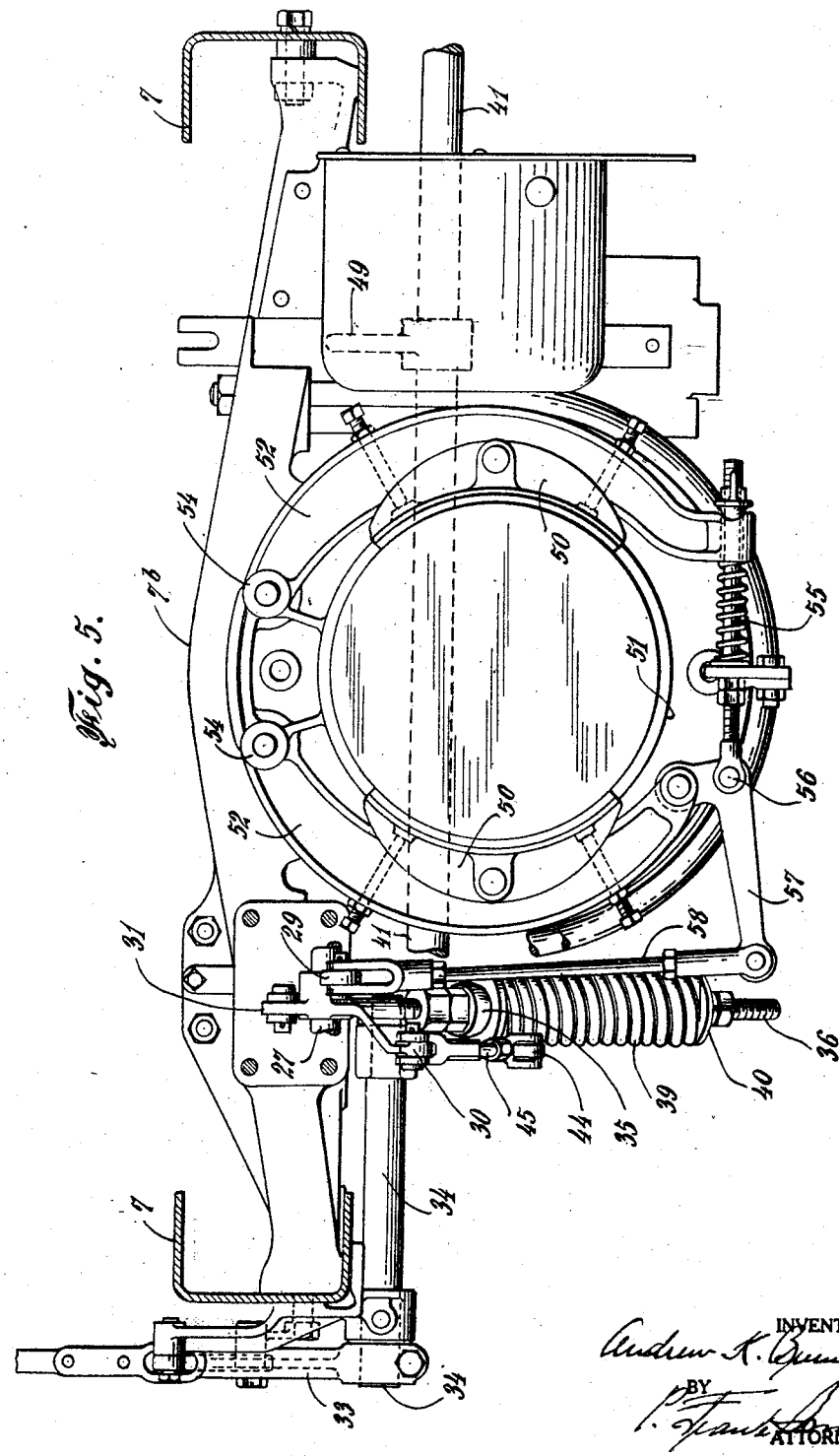

1,573,628

UNITED STATES PATENT OFFICE.

ANDREW K. BRUMBAUGH, OF ARDMORE, PENNSYLVANIA, ASSIGNOR TO THE AUTO-CAR COMPANY, OF ARDMORE, PENNSYLVANIA, A CORPORATION OF PENNSYLVANIA.

METHOD OF AND MEANS FOR CONTROLLING THE OPERATION OF MOTOR VEHICLES.

Application filed January 6, 1925, Serial No. 786. Renewed January 8, 1926.

*To all whom it may concern:*

Be it known that I, ANDREW K. BRUMBAUGH, a citizen of the United States, residing at Ardmore, in the county of Montgomery and State of Pennsylvania, have invented certain new and useful Improvements in Methods of and Means for Controlling the Operation of Motor Vehicles, of which the following is a specification.

The present invention relates generally to motor-vehicles and is more especially directed to improvements in the methods and means of controlling the operation of such vehicles.

As is well known, while motor-vehicles have gone into extensive use in the commercial fields, there are certain lines of industry to which motor-vehicles of existing types are not adaptable. For example, in the retail delivery of milk, the horse drawn vehicle is still used almost exclusively, because of the fact that the motor-vehicle cannot meet the peculiar requirements of the delivery system in a manner which would render its adoption an economic necessity.

The mode of operation of the retail milk delivery system is commonly known, a vehicle being handled by one man who also makes the deliveries, carrying the goods from the wagon to the customers' doors. In covering a so-called delivery route, innumerable stops are made, the wagon being moved many times in the length of an ordinary city block or square. Obviously, motor-vehicles with the present methods of controls, which make it necessary for one to assume his position in the driver's seat in order to move the vehicle a short distance, are entirely unsuited for the work. The time lost in moving the vehicle would offset every other economic advantage which might flow from its use.

The retail milk delivery system is merely cited as a familiar example, other industries where delivery systems are similarly carried out being more or less numerous. Without question, motor-vehicles, which possess many points of superiority over the horse drawn wagon, especially as regards sanitation, would supersede the latter in all of those commercial lines if the chief obstacle to their adoption, which, as pointed out, resides in the method of controlling their operation, was overcome.

The primary object of the present invention is to provide a method and means for controlling the operation of motor-vehicles from a point distant or remote from the driver's seat, whereby their general usefulness may be increased, and to render such vehicles especially available for those commercial services to which motor-vehicles having the existing types of control are not adaptable.

It is also an object of my invention to provide a simple method of distant control for motor-vehicles, especially those which are electrically powered, which may be economically installed in existing types of vehicles as well as in specially designed structures, the remote control being supplemental to the usual control devices operated from the driver's seat.

My invention further contemplates a method and means of controlling the operation of a motor-vehicle independently of the control devices operated from the driver's seat, wherein the movement of the vehicle may be positively governed by the operator from a point exterior of the body of the vehicle.

My invention also comprehends a method and means of manually controlling the operation of a motor-vehicle at a point distant from the driver's seat, which possesses the aforesaid advantages and characteristics, wherein the delivery of power to the driven elements and the functioning of the vehicle brake may be positively governed, the maximum of power transmitted when the vehicle is operating under such distant control being fixed to insure safety in operation.

More specifically, my invention is directed to a system of manually controlling the delivery of power to the driven elements of a stationary vehicle and simultaneously counteracting the braking effort of the previously applied brakes, so as to permit the vehicle to move under power, as desired by the operator, the functioning of said system being accomplished independently of the regulation power and brake controlling media and from a point distant or remote therefrom, as from the running board or step of the vehicle.

Other objects and advantages flowing from the practicing of my invention will present themselves as the description proceeds, and I would have it clearly understood that I reserve unto myself all rights to the full range of equivalents, both in structure and in use, to which I may be entitled under my invention in its broadest aspect.

For the purposes of the present disclosure, I have elected to illustrate and describe two preferred embodiments of my invention, one as applied to the chassis of a vehicle in which the service and emergency brakes are on the rear wheels, and the other to a structure wherein the emergency or hand operated brake is operative upon the propeller or driving shaft of the vehicle. It will be evident, however, that my method of control may be practiced in other ways and by different arrangements of mechanism, without departing from the spirit and scope of my invention, as defined by the appended claims.

In the accompanying drawings:

Figure 1 is a side elevation of the chassis of a motor-vehicle having so-called rear end brakes, to which mechanism for practicing my method of distant control is applied, certain parts having been omitted for the sake of clearness.

Figure 2 is a top plan view of the structure shown in Figure 1, with the omitted parts shown.

Figure 3 is a side elevation of a fragment of the forward part of a motor-vehicle having a propeller or drive shaft brake, showing the application of my invention thereto.

Figure 4 is a top plan view of the structure shown in Figure 3, disclosing the means for manually functioning the remote control mechanism, and Figure 5 is a view in elevation, looking from the left of Figure 3.

In describing the structures shown in the drawings, like characters of reference will be employed to designate similar parts in the several views.

Referring now particularly to the mechanism for practicing my invention, as shown in Figures 1 and 2 of the drawings, 7 indicates the conventional longitudinal members of a motor-vehicle frame, the rear axle housing 8 being connected thereto by the usual spring suspension means (not shown). The wheel 9 embodies the common form of brake-drum 10 with which the usual internal and external brake bands are cooperatively associated. These elements and the conventional mechanism for contracting the external band and expanding the inner one are well known to those versed in the art and do not form a part of the present invention.

In the structure shown, the arms or levers 11 and 12, whereby the internal and external brake bands are respectively functioned are concentrically mounted in accordance with standard practice, the external or service brake levers 12 being connected to the transverse shaft 13 by means of the rods 14 having the usual pin and clevis connections with said levers 12 and with the dependent arms or levers 15 keyed to said transverse shaft 13 (see Figure 2).

Adjacent to one end thereof, the shaft 13 carries an arm 16 rigidly fixed thereto, this arm 16 and the contiguous lever 15 providing a mounting for the member 17 which has a bearing intermediate its ends for the reception of the rod 18. This rod, it will be observed, carries a spring 19 which is confined between the member 17 and the collar 18$^a$ fixed to said rod at a point adjacent to said member. A wing nut 20 in engagement with the threaded end 18$^b$ of the rod 18 is employed for regulating the tension of the spring 19, it being apparent that as said nut, which bears against the member 17, is turned up upon the threaded end of the rod 18, the spring 19 will be compressed between said member and the collar 18$^a$. The base of the nut 20 is suitably notched to cooperate with complemental projections on the abutting face of the member 17, in the usual manner, so that it will be positively retained in position when an adjustment is made to compensate for wear in the brake bands, or for other reasons. The rod 18 is connected to the foot-pedal lever or arm 21, fulcrumed at 21$^a$, by means of the pin and clevis indicated at 22, so that it will be evident that upon the depression of the pedal 21$^c$, the braking effort will be transmitted to the contractible external brake bands through the medium of the cross shaft 13 which is rocked in its bearings 13$^a$ in response to the movement of the rod 18 connected thereto by the equalizer member 17, as described.

Preferably positioned forwardly of the cross-shaft 13, and likewise supported from the transverse vehicle frame member 7$^a$, in suitable bearings 23, is a shaft 24, to which the dependent arms or levers 25 are keyed, these latter levers being connected to the aforementioned levers 11 by the rods 26 in the customary manner.

Pivotally mounted at 27 upon a suitable bracket 28 fixed to the transverse frame member 7$^b$ is a bell crank lever having three arms, 29, 30 and 31 respectively, the arm 29 being connected to one of the levers 25 of the shaft 24, by means of the rod 32. The hand lever 33, which is of the usual type, is mounted on the short shaft 34, preferably adjacent to the outer end thereof, the inner end of said shaft being supported in a suitable bearing provided in the hanger 34ª. Mounted on said shaft 34 adjacent to the inner end thereof, and rotatable therewith, is an arm 35, one end of which is apertured, or bifurcated if desired, to receive and form a bearing for the rod 36 pivotally connected at one end to the bell crank lever arm 31. The arm 35 which is so disposed upon the shaft 34 as to form approximately a ninety degree angle with the rod 36 when the elements of the mechanism are in their relative normal positions, is interposed between the shoulder or stop provided by the nuts 37 on the rod 36 and the complemental surface of the member 38 slidable on said rod in engagement with one end of the spring 39.

The free end of the rod 36, it will be noted, is threaded to receive the lock and securing nuts 36ª and 36ᵇ, the latter abutting upon the washer 40 which is in engagement with the lower end of the spring 39, whereby the tension of the latter may be regulated. From the description of the internal or so-called emergency brake operating mechanism thus far given, it will be manifest that upon the hand lever 33 being pulled backward by the operator of the vehicle, the braking effort will be transmitted to the brake bands through the medium of the rod 32 and the bell crank lever, the latter rocking upon its axis as the inclined rod 36 travels downwardly in response to the pressure imposed upon the spring 39 by the arm 35, the end of the latter being in continuous engagement with the dome-shaped member 38. To obtain this result, it is obvious that the spring 39 must be strong enough to resist compression by the leverage forces applied through the hand lever actuated arm 35 so that the movement of the hand lever to braking position will insure positive application of the braking effort to the rear wheels through the interconnected linkages. In other words, the non-yieldability of the spring 39 under load will produce the same result as would obtain, were the end of the arm 35 pivotally connected to the rod 36 for movement on an axis transverse thereof. The hand lever 33, when drawn to its brake applying position, is automatically retained or locked therein by any suitable means, such as a spring actuated pawl and ratchet mechanism of the conventional type used in motor-vehicle construction.

Disposed transversely of the vehicle, and preferably projecting beyond the longitudinal vehicle frame members 7, is a shaft 41 mounted to rotate in suitable bearings provided in the brackets 42, one of which is supported upon or in proximity to each end of the vehicle running-board or step 43. The aforesaid shaft 41 carries an arm or lever 44 rigidly fixed thereto, to which one end of the rod 45 is pivotally connected, as by a pin and clevis, as shown at 45ª, the other end of said rod being similarly fastened to the arm 30 of the bell-crank lever.

Mounted upon the shaft 41, preferably at or adjacent to each end thereof, is a pedal 46, this pedal being movable with said shaft and located for convenient manipulation by the foot of a person standing upon the contiguous running-board or step, as the case may be.

Assuming that the vehicle is stationary, with the so-called emergency brake applied by the manipulation of the hand lever 33, which is locked in position as previously described, and it is desired to operate the vehicle a short distance, say one hundred feet, without the driver taking his place behind the steering wheel, the latter mounts the running-board or step at the side nearer to him, places one foot upon the adjacent pedal 46 and bears down upon it. As will be clearly apparent from Figure 2 of the drawings, the lever or arm 44 is substantially in alinement with the bell-crank lever so that as the pedal is depressed, in the manner stated, the shaft 41 will rock upon its axis and impart a similar rotative motion to the bell-crank lever, by the direct pull exerted through the interconnected rod 45. The resulting arcuate movement of the bell-crank lever arm 28 tends to pull the rod 36 upwardly through the apertured end of the now stationary arm 35 of the hand lever shaft 34, the multiplied forces of leverage developed by the operation of the foot pedal 46 being ample to overcome the tension of the spring 39 which is compressed between the washer 40 and the arm 35 as the rod 36 moves through its bearing in the latter. Obviously as the bell-crank lever rotates, the tension on the rods 32 and 26 will be relieved and the brakes released.

Coincident with the releasing of the brakes in the manner described, power is automatically transmitted to the driving wheels 9. This may be accomplished by any suitable means adapted to function upon the depression of either pedal 46. In the present showing, wherein the power unit is an electric motor indicated at 47, the circuit to the power transmitting mechanism is closed through a switch or contacter 48 of any suitable design, which may have a reciprocable member connected to and adapted to be actuated by the arm 49, fixed to the shaft 41, as the latter rocks upon its axis.

In connecting the contacter 48 in the circuit, any suitable method of wiring may be employed. It has been found in the practical use of the invention described that highly satisfactory results are obtained by connecting the contacter to the ordinary resister in such a manner that the hand controller may be left engaged with the first notch, instead of being moved to the normal "off" position, when the vehicle is not in motion. Thus, when the pedal 46 is depressed, the power transmitted will be entirely adequate to move the load and maintain the vehicle in motion at a sustained low speed which will insure a maximum of safety in operation. Ordinarily, the vehicle will track in a substantially straight line, for the distance which it is moved, leaving the operator free to handle the goods while still controlling its forward motion by means of the pedal 46. However, should he desire, or find it necessary, to guide its movement, or change its course, he can readily accomplish this by grasping the steering wheel with one hand without moving from his position on the running-board.

When the vehicle has traversed the desired distance, the brakes are again applied automatically and the power cut off by the operator removing his foot from the pedal 46 and permitting it to return to its normal position under the influence of the expansion force of the spring 39, it being readily understood that while the hand lever 33 remains locked in its brake applying position, the brakes will be automatically re-applied each time either of the pedals 46 is released.

In the structure shown in Figures 3 to 5 inclusive, the braking elements which are functioned by the hand lever 33 are adapted to engage a drum carried on the propeller shaft, the foot operated braking mechanism, of which the pedal arm 21 and rod 18 are shown, being similar to that illustrated in Figures 1 and 2, or of any of the many conventional designs.

The brake shoes 50 having effective surfaces complemental to the drum 51 are carried on the arms 52 pivoted at 54, adjustments being provided for by the equalizer 55, one end of which is connected at 56 to the lever 57. This structure does not form a part of the present invention and it will be manifest that my invention may be applied to other types of propeller shaft braking mechanisms with equal facility and effectiveness in operation.

Similarly to the structure shown in Figures 1 and 2, a spring 39 is confined between the abutments formed by the nuts 36$^b$ and 37 upon the rod 36, the arm 35 of the hand lever shaft being slidable upon said rod and in engagement with the member 38 supported upon the contiguous end of the spring.

When the hand lever is drawn back, the resistance of the spring 39 causes the rod 36 to be moved downwardly in response to the arcuate movement of the arm 35. The arm 31 of the bell-crank lever is pivotally connected to said rod 36, while the arm 29 is similarly fastened to the rod 58 which has a pivotal connection at 59 with the aforesaid brake actuating lever 57. Therefore, it will be apparent that as the arm 36 moves downwardly as aforesaid, the resulting rocking of the bell-crank lever on its axis and the arcuate movement of the arm 29 will exert a pull upon the rod 58 which functions the lever 57 to contract the brake shoes 50 upon the surface of the drum 51. As the hand lever 33 is automatically locked in its brake applying position, as heretofore described, it will be evident that the brakes will remain in set position until manually released, either by the movement of the hand lever or the operation of one of the pedals 46.

As in the previously described structures of Figures 1 and 2, the pedals 46 are mounted on a cross-shaft 41 rotatable in bearings provided in the brackets 42 the lever or arm 44 fixed to said shaft being connected to the arm 30 of the bell-crank lever by the rod 45. The depression of either of the pedals 46 will thus rock the shaft 41 to effect a similar movement of the bell-crank lever to pull the rod 36 upward against the tension of the spring 39 which is compressed between the washer 40 and the now immovable arm 35. The movement of the arm 49, simultaneously with the rocking of the shaft 41 actuates the circuit making elements of the contacter 48 and as the brakes are relieved, the power is thus transmitted to the driving wheels.

From the foregoing description of my invention, it will be seen that I have evolved a form of supplemental control mechanism for motor-vehicles which is simple and durable in construction and positive in operation. Any adjustments which may be required from time to time, may be readily effected with little labor so that maintenance costs are negligible. Furthermore, the manner in which the control pedal is designed to be actuated to simultaneously relieve the brakes and apply the driving power permits of the employment of a vehicle thus equipped in various fields of endeavor which have heretofore been closed to motor-vehicles for the reasons previously pointed out.

The use of my invention is not confined to any particular commercial field, as manifestly, it is of general utility. For instance, it will be evident that any vehicle equipped with my invention may be more quickly and safely handled in backing against a platform or street curbing than one having only the regulation controls, operated from the driver's seat, this being especially true where the clearances between adjacent vehicles are small. In the backing operation, the driver applies the brakes through the medium of the hand lever 33 and sets the power controller in the first reverse notch. He then assumes a position on the running-board, facing to the rear, and operates the pedal 46, meanwhile guiding the movement of the vehicle by means of the steering-wheel which he grasps with one hand.

While specific forms of mechanisms have been described for practicing my method of distance or remote control for motor-vehicles, it will be evident that other arrangements of mechanism may be utilized in attaining the objects to which my invention is directed, as hereinbefore set forth.

I claim:

1. The combination with a motor-vehicle having brake actuating mechanism and power applying devices normally operable from the driver's seat, of means located at a point remote from the driver's seat for releasing the vehicle brakes and simultaneously applying the power.

2. The combination with a motor-vehicle having brakes and mechanism for applying the same, including a lever operable from the driver's seat, of means independent of said lever for releasing the brakes, said means embodying a pedal located externally of the vehicle body.

3. The combination with a motor-vehicle having brakes and brake actuating mechanism, including means normally operable from the driver's seat for applying and releasing the brakes, of means remote therefrom for releasing the brakes while the means operable from the driver's seat are in brake applying position.

4. The combination with a motor-vehicle having brakes and mechanism for applying and releasing said brakes, said mechanism being actuatable by a lever operable from the driver's seat, of means for manually releasing and automatically reapplying the brakes at will and independently of the movement of said lever.

5. In a motor-vehicle having brakes, the combination of brake actuating mechanism, means for manually controlling the functioning of said mechanism to apply and release the brakes, said means being located adjacent the driver's seat, and means remote from the driver's seat and operable by a single movement to release the brakes.

6. In a motor-vehicle having brakes, the combination of brake actuating mechanism, means for manually controlling the functioning of said mechanism to apply and release the brakes, said means being located adjacent the driver's seat, and means remote from the driver's seat and manually operable in one direction to release the brakes, the movement of said means in the opposite direction permitting automatic application of the brakes.

7. In a motor-vehicle having brakes, the combination of brake actuating mechanism, an element movable in one direction to function said mechanism to apply the brakes and in the other to release the brakes, said element being located adjacent to the driver's seat, means for locking said element in brake applying and brake releasing positions, and means remote from said element adapted to be operated to actuate said mechanism to release the brakes while said element remains locked in brake applying position.

8. In a motor-vehicle having brakes, the combination of brake actuating mechanism, an element movable in one direction to function said mechanism to apply the brakes and in the other to release the brakes, said element being located adjacent the driver's seat, means for locking said element in brake applying and brake releasing positions, and means remote from said element adapted to be operated to actuating said brake mechanism to release the brakes while said element remains locked in brake applying position, said brake actuating mechanism automatically functioning to reapply the brakes when said remote means become inoperative.

9. A supplemental control for motor-vehicles located at a point remote from the devices normally operable from the driver's seat for actuating the vehicle brakes and governing the application of power to the driving wheels, said supplemental control being operable to simultaneously function the brake actuating mechanism to release the brakes and apply the power for movement of the vehicle.

10. Means for controlling the operation of a motor-vehicle, comprising an element located at a point remote from the control media adjacent the driver's seat, and mechanism whereby the actuation of said element will effect the release or application of the vehicle brakes and simultaneously control the delivery of power to the driving mechanism of the vehicle.

11. A system of controlling the actuation of the braking mechanism of a motor-vehicle, comprising a hand operated lever mounted in proximity to the driver's seat, means for transmitting the braking effort to the brakes, said means including a normally non-yielding resilient element, means for locking said hand lever in brake applying position and means independent of said hand lever for causing said resilient element to yield, whereby the release of the brakes may be effected while said hand lever remains in brake applying position.

12. A system of controlling the actuation of the braking mechanism of a motor-vehicle and the application of power to the driving mechanism thereof, comprising a hand operated lever mounted in proximity to the driver's seat, means for transmitting braking effort through a normally non-yieldable connection, means for locking the hand lever in brake applying position, means independent of said hand lever for rendering said connection yieldable whereby the release of the brakes may be effected while said hand lever remains in brake applying position and means functioned by said independent means for transmitting power to the vehicle driving mechanism coincidently with the releasing of the brakes.

13. The method of controlling the operation of a motor-vehicle from a point on said vehicle remote from the brake mechanism and power controls disposed adjacent to the driver's seat, which consists in applying the braking effort obtained by the actuation of the brake mechanism control through a normally non-yielding connection, locking said brake mechanism in brake applying position and rendering said normally non-yieldable connection yieldable by the application of pressure at such remote point to counteract the braking effort.

14. The method of controlling the operation of a motor-vehicle from a point on said vehicle remote from the brake mechanism and power controls disposed for manual operation adjacent to the driver's seat, which consists in applying the braking effort obtained by the actuation of the brake mechanism control through a normally-non-yieldable connection, locking said brake mechanism in brake applying position, rendering said normally non-yieldable connection yieldable by the application of a force at such remote point to counteract the braking effort and simultaneously effecting the delivery of operating power to the vehicle from said remote point.

ANDREW K. BRUMBAUGH.